Nov. 10, 1925.
H. H. WEST
SPROCKET CHAIN LINK
Filed Dec. 22, 1924
1,560,923
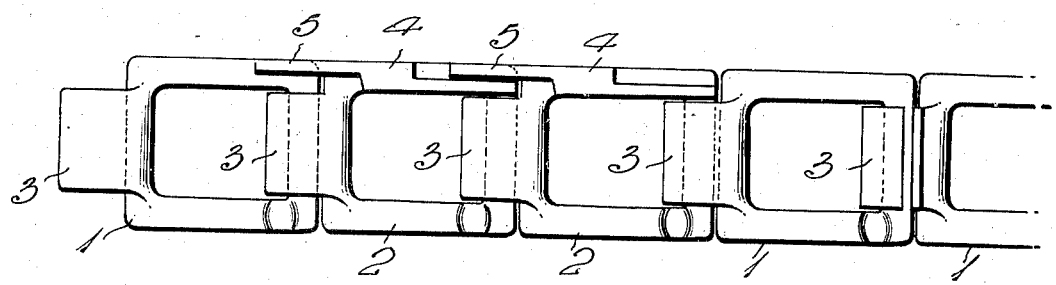
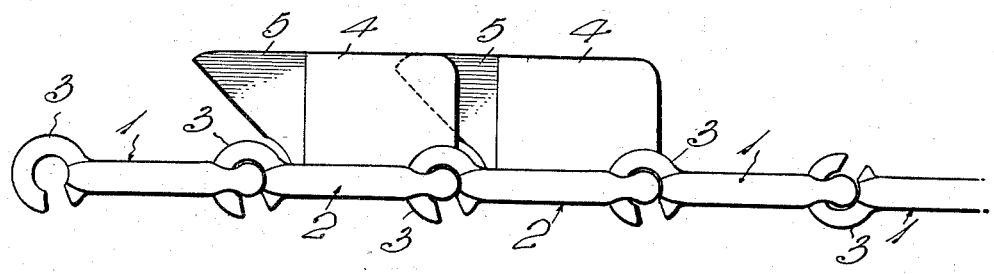
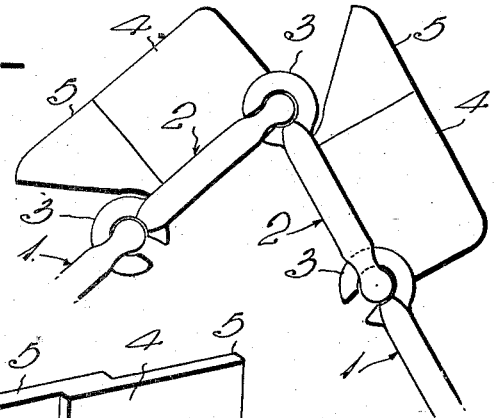
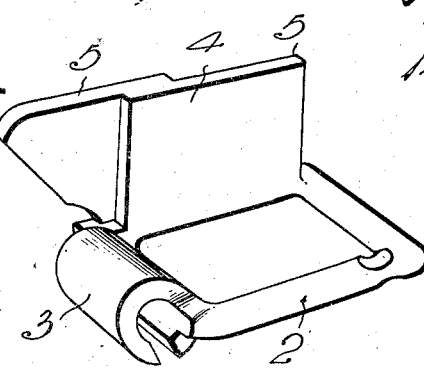
Inventor
H. H. West
Witness
H. Woodard
By H. B. Willson &Co
Attorneys Patented Nov. 10, 1925.

1,560,923

UNITED STATES PATENT OFFICE.

HARRY H. WEST, OF KINGSTON, PENNSYLVANIA.

SPROCKET-CHAIN LINK.

Application filed December 22, 1924. Serial No. 757,572.

*To all whom it may concern:*

Be it known that I, HARRY H. WEST, a citizen of the United States, residing at Kingston, in the county of Luzerne and State of Pennsylvania, have invented certain new and useful Improvements in Sprocket-Chain Links; and I do declare the following to be a full, clear, and exact description of the invention, such as will enable others skilled in the art to which it appertains to make and use the same.

My invention relates to new and useful improvements in sprocket chains and has reference primarily to the so-called bump links of pattern chains used on knitting machines and the like. The invention has reference to the particular type of chain which includes a pair of one-piece links each having parallel sprocket-straddling side bars and parallel sprocket-tooth-engaging-end-bars, one link having one of its side bars of less thickness than one of its end bars at its point of juncture with the latter, a hook on the adjacent end bar of the other link engageable with and disengageable from said one end bar only when the two links are angled to permit lateral passage of said one side bar past the hook bill, and lugs projecting from the sides of the links remote from their sprocket-engaging sides. The connecting hook of links of this type, commonly opens outwardly, that is has its bill disposed at the side of the links remote from their sprocket-engaging sides and this causes a great deal of trouble when connecting or disconnecting the links, as when these links are relatively angled, the lugs or bumps are in a great majority of cases moved into interfering relation with each other so that relative lateral shifting of the links is interfered with, if not totally prevented. This trouble has heretofore necessitated the expenditure of a great deal of time in filing or grinding the trip lugs sufficiently to permit them to clear each other and allow connection or disconnection of the links. It is the primary object of my invention however to improve upon chains of the type set forth, by disposing the bill of the link connecting hook, at the sprocket-engaging side of the chain rather than at the opposite side of such chain. Thus, to connect or disconnect the links, they must be angled in the opposite direction from that now ordinarily effected, and consequently there is no danger whatever of the trip lugs moving into interfering relation with each other. In fact, they are moved away from each other when the links are angled and hence said links may be readily shifted laterally with respect to each other when performing a connecting or disconnecting operation.

In chains of the type to which I have referred, the hooks of the links provided with no trip lugs, have only a portion of their exterior shaped to engage the guiding sprocket or sprockets of the chain, with the result that the chain will effectively cooperate with the sprocket or sprockets only if the proper side of the links are applied next to the sprocket or sprockets. It is a further aim of my invention to improve upon this ordinary construction, by providing a connecting hook which extends equidistantly from opposite sides of the link by which it is carried, and by the provision of a hook which is of cylindrical form, with a uniform diameter throughout its circumference. Thus, care need not be taken in applying these links, as they will operate advantageously whether one side or the other be positioned to engage the sprocket or sprockets.

With the foregoing in view, the invention resides in the novel subject matter hereinafter described and claimed, the description being supplemented by the accompanying drawing.

Figure 1 is a top plan view of a portion of a chain embodying my invention.

Figure 2 is an edge view.

Figure 3 is a detail view similar to a portion of Fig. 2 but illustrating the manner in which the links may be angled and connected or disconnected, without interference on the part of the trip lugs.

Figure 4 is a perspective view of one of the links shown in the preceding figures.

In the drawing above briefly described, I have illustrated a portion of a pattern chain composed of a number of plain links 1 and "bump" links 2. One end of each link is provided with a hook 3 which is preferably of cylindrical form in edge view, and of uniform diameter throughout its circumference, said hook opening toward one side of the link and projecting equidistantly from both sides thereof. This disposition and form of the hooks 3 of the plain links 1 permits either side of these links to be used against the sprocket wheel or wheels around which the chain is trained. Similarly, even though the hooks of the "bump" links 2 open toward the sprocket side of said links, the formation of said hooks permits proper co-action thereof with the sprocket wheel or wheels.

The trip lug or "bump" 4 of each of the links 2, projects from the side of the link remote from the side at which the hook 3 opens, that is the sprocket-engaging side. Thus, when any two adjacent links are relatively angled to connect or disconnect them, the lugs will entirely clear each other as shown in Fig. 3 instead of interfering with quick and easy connection or disconnection of said links. Thus, the provision of the hook opening toward the sprocket-engaging side of the link 2 and a trip lug projecting from the opposite side of said link, constitutes a marked advance in the art of pattern and analogous chains, which will effect a great saving in trouble, time and patience. My improvement also permits the use of trip lugs of substantially the same length as the links by which they are carried, said lugs having relatively offset ends 5 to overlap corresponding ends of adjacent links. Regardless of this overlap, the lugs will not interfere with quick and easy connection or disconnection of adjacent links, as when said links are angled as shown in Fig. 3, the lugs move out of overlapping relation with each other.

Obviously, the links may be of any desired configuration, the trip lugs 4 may be of any of the well known shapes or of any other desired shape, and any desired number of these lugs may be used on any one link, located as occasion may demand.

As excellent results are obtainable from the general construction shown, it may in most instances be followed. However, within the scope of the invention as claimed, numerous modifications may of course be made.

I claim:

1. An improvement in a sprocket-guided pattern chain or analogous chain of a type including a pair of one-piece links each having parallel sprocket-straddling side bars and parallel sprocket-tooth-engaging end bars, one link having one of its side bars of less thickness than one of its end bars at its point of juncture with the latter, a hook on the adjacent end bar of the other link engageable with and disengageable from said one end bar only when the two links are angled to permit lateral passage of said one side bar past the hook bill, and lugs projecting from the sides of the links remote from their sprocket-engaging sides; said improvement consisting in disposing the aforesaid hook bill at the sprocket-engaging side of the chain, whereby angling of the links to connect or disconnect them will not move said lugs into such relation with each other as to interfere with relative lateral shifting of the two links.

2. An improvement in a sprocket-guided pattern chain or analogous chain of a type including a pair of one-piece links each having parallel sprocket-straddling side bars and parallel sprocket-tooth-engaging end bars, one link having one of its side bars of less thickness than one of its end bars at its point of juncture with the latter, and a hook on the adjacent end bar of the other link engageable with and disengageable from said one end bar only when the two links are relatively angled; said improvement consisting in disposing said hook to extend equidistantly from the inner and outer sides of the chain and shaping said hook in the form of a cylinder with its external diameter uniform throughout its circumference to accurately engage a sprocket, whereby either side of said link may be applied next to the sprocket.

In testimony whereof I have hereunto affixed my signature.

HARRY H. WEST.